(12) United States Patent
Huang et al.

(10) Patent No.: US 12,676,538 B2
(45) Date of Patent: Jul. 7, 2026

(54) CIRCUITS AND METHODS FOR OPERATION OF ASYMMETRIC HALF-BRIDGE FLYBACK CONVERTER WITH ZVS WINDINGS

(71) Applicant: NAVITAS SEMICONDUCTOR LIMITED, Dublin (IE)

(72) Inventors: Xiucheng Huang, Torrance, CA (US); Weijing Du, Torrance, CA (US); Yun Zhou, Shenzhen (CN); Guoxing Zhang, Shenzhen (CN)

(73) Assignee: Navitas Semiconductor Limited, Dublin (IE)

( * ) Notice: Subject to any disclaimer, the term of this patent is extended or adjusted under 35 U.S.C. 154(b) by 234 days.

(21) Appl. No.: 18/506,955

(22) Filed: Nov. 10, 2023

(65) Prior Publication Data
US 2024/0162826 A1 May 16, 2024

(30) Foreign Application Priority Data
Nov. 16, 2022 (CN) .......................... 202211459158.6

(51) Int. Cl.
| | |
|---|---|
| *H02M 1/00* | (2007.01) |
| *H02M 3/00* | (2006.01) |
| *H02M 3/335* | (2006.01) |

(52) U.S. Cl.
CPC ....... *H02M 1/0006* (2021.05); *H02M 1/0058* (2021.05); *H02M 3/01* (2021.05); *H02M 3/33523* (2013.01); *H02M 3/33571* (2021.05)

(58) Field of Classification Search
CPC ............... H02M 3/01; H02M 3/33523; H02M 3/33571; H02M 1/0006; H02M 1/0058
See application file for complete search history.

(56) References Cited

U.S. PATENT DOCUMENTS

| | | | |
|---|---|---|---|
| 2015/0311796 A1* | 10/2015 | Dubois | H03K 17/567 |
| | | | 363/21.01 |
| 2019/0229627 A1* | 7/2019 | Hande | H02M 1/08 |
| 2020/0177085 A1* | 6/2020 | Mizoe | H02M 3/33523 |

(Continued)

FOREIGN PATENT DOCUMENTS

| | | | | |
|---|---|---|---|---|
| CN | 115549478 A | * | 12/2022 | ......... H02M 1/0058 |
| CN | 119134912 A | * | 12/2024 | ........... H02M 1/322 |
| EP | 4131750 A1 | * | 2/2023 | ........ H02M 3/33571 |

*Primary Examiner* — Crystal L Hammond
*Assistant Examiner* — Jennifer C Caulk
(74) *Attorney, Agent, or Firm* — Fisher Broyles, LLP

(57) ABSTRACT

A circuit is disclosed. The circuit includes a transformer having a primary winding extending between a first terminal and a second terminal, and further including a secondary winding extending between a third terminal and a first output terminal; a first switch having a first gate terminal, a first source terminal and a first drain terminal, the first drain terminal coupled to the second terminal and the first source terminal coupled to a power source; a second switch having a second gate terminal, a second source terminal and a second drain terminal, the second source terminal coupled to the second terminal, and the second drain terminal coupled to the power source; and a third switch having a third gate terminal, a third source terminal and a third drain terminal, the third source terminal coupled to the third terminal and the third drain terminal coupled to a second output terminal.

16 Claims, 5 Drawing Sheets

(56)     References Cited

U.S. PATENT DOCUMENTS

| 2020/0274530 A1* | 8/2020 | Lueders | ................. | H02M 1/08 |
| 2022/0271675 A1* | 8/2022 | Yang | .................. | H02M 1/0058 |
| 2022/0416644 A1* | 12/2022 | Xu | ..................... | H02M 1/0009 |

* cited by examiner

CIRCUITS AND METHODS FOR OPERATION OF ASYMMETRIC HALF-BRIDGE FLYBACK CONVERTER WITH ZVS WINDINGS

CROSS-REFERENCE TO RELATED APPLICATIONS

The present application claims priority to Chinese Patent Application No. 202211459158.6 filed on Nov. 16, 2022, entitled "Asymmetric Half-Bridge Flyback Converter and ZVS Implementation Method", the contents of which are incorporated herein by reference in their entirety for all purposes.

FIELD

The described embodiments relate generally to power converters, and more particularly, the present embodiments relate to systems and methods for operation of asymmetric half-bridge flyback power converters with ZVS windings.

BACKGROUND

Electronic devices such as computers, servers and televisions, among others, employ one or more electrical power conversion circuits to convert one form of electrical energy to another. Some electrical power conversion circuits use switching power supplies such as a flyback converter. Switching power supplies can efficiently convert power from a source to a load. Switching power supplies may have relatively high power conversion efficiency, as compared to other types of power converters. Switching power supplies may also be substantially smaller and lighter than a linear supply due to the smaller transformer size and weight.

SUMMARY

In some embodiments, a circuit is disclosed. The circuit includes a transformer having a primary winding extending between a first terminal and a second terminal, and further including a secondary winding extending between a third terminal and a first output terminal; a first switch having a first gate terminal, a first source terminal and a first drain terminal, the first drain terminal coupled to the second terminal and the first source terminal coupled to a power source; a second switch having a second gate terminal, a second source terminal and a second drain terminal, the second source terminal coupled to the second terminal, and the second drain terminal coupled to the power source; a third switch having a third gate terminal, a third source terminal and a third drain terminal, the third source terminal coupled to the third terminal and the third drain terminal coupled to a second output terminal; and a first winding having a winding direction that is opposite to that of the primary winding and being electromagnetically coupled to the primary winding.

In some embodiments, the circuit further includes a fourth switch having a fourth gate terminal, a fourth source terminal and a fourth drain terminal, where the fourth drain terminal is coupled to the first winding.

In some embodiments, the circuit further includes a second winding having a winding direction that is opposite to that of the primary winding, the second winding coupled to the first winding.

In some embodiments, the fourth switch is arranged to be turned-on prior to a first switch turn-on.

In some embodiments, the fourth switch is a gallium nitride (GaN) based transistor.

In some embodiments, the circuit further includes a load coupled between the first output terminal and the second output terminal, the load having an output voltage across it.

In some embodiments, when the output voltage is high, the fourth switch is arranged to decrease an on-time of the fourth switch and when the output voltage is low, the fourth switch is arranged to increase the on-time of the fourth switch.

In some embodiments, the first winding is arranged to have a number of turns that is greater than a product of number of turns of the secondary winding and voltage across the first winding divided by the output voltage.

In some embodiments, the fourth switch is a silicon based transistor.

In some embodiments, the secondary winding has a winding direction that is opposite to that of the primary winding.

In some embodiments, a circuit is disclosed. The circuit includes a transformer including a primary winding extending between a first terminal and a second terminal, and further including a secondary winding extending between a third terminal and a first output terminal; a first switch having a first gate terminal, a first source terminal and a first drain terminal, the first drain terminal coupled to the second terminal and the first source terminal coupled to a power source; a second switch having a second gate terminal, a second source terminal and a second drain terminal, the second source terminal coupled to the second terminal, and the second drain terminal coupled to the power source; a third switch having a third gate terminal, a third source terminal and a third drain terminal, the third source terminal coupled to the third terminal and the third drain terminal coupled to a second output terminal; a first winding having a winding direction that is opposite to that of the primary winding and being electromagnetically coupled to the primary winding; a low-side winding having a winding direction that is opposite to that of the primary winding, the low-side winding coupled to the first winding; and a high-side winding having a winding direction that is opposite to that of the primary winding, the high-side winding coupled to the first winding.

In some embodiments, a circuit is disclosed. The circuit includes a transformer including a primary winding extending between a first terminal and a second terminal, and further including a secondary winding extending between a third terminal and a first output terminal; a first switch having a first gate terminal, a first source terminal and a first drain terminal, the first drain terminal coupled to the second terminal and the first source terminal coupled to a power source; a second switch having a second gate terminal, a second source terminal and a second drain terminal, the second source terminal coupled to the second terminal, and the second drain terminal coupled to the power source; a third switch having a third gate terminal, a third source terminal and a third drain terminal, the third source terminal coupled to the third terminal and the third drain terminal coupled to a second output terminal; a low-side winding having a winding direction that is opposite to that of the primary winding and being electromagnetically coupled to the primary winding; and a high-side winding having a winding direction that is opposite to that of the primary winding, the high-side winding coupled to the low-side winding.

In some embodiments, the first switch is GaN-based transistor.

DETAILED DESCRIPTION

Figure 1:
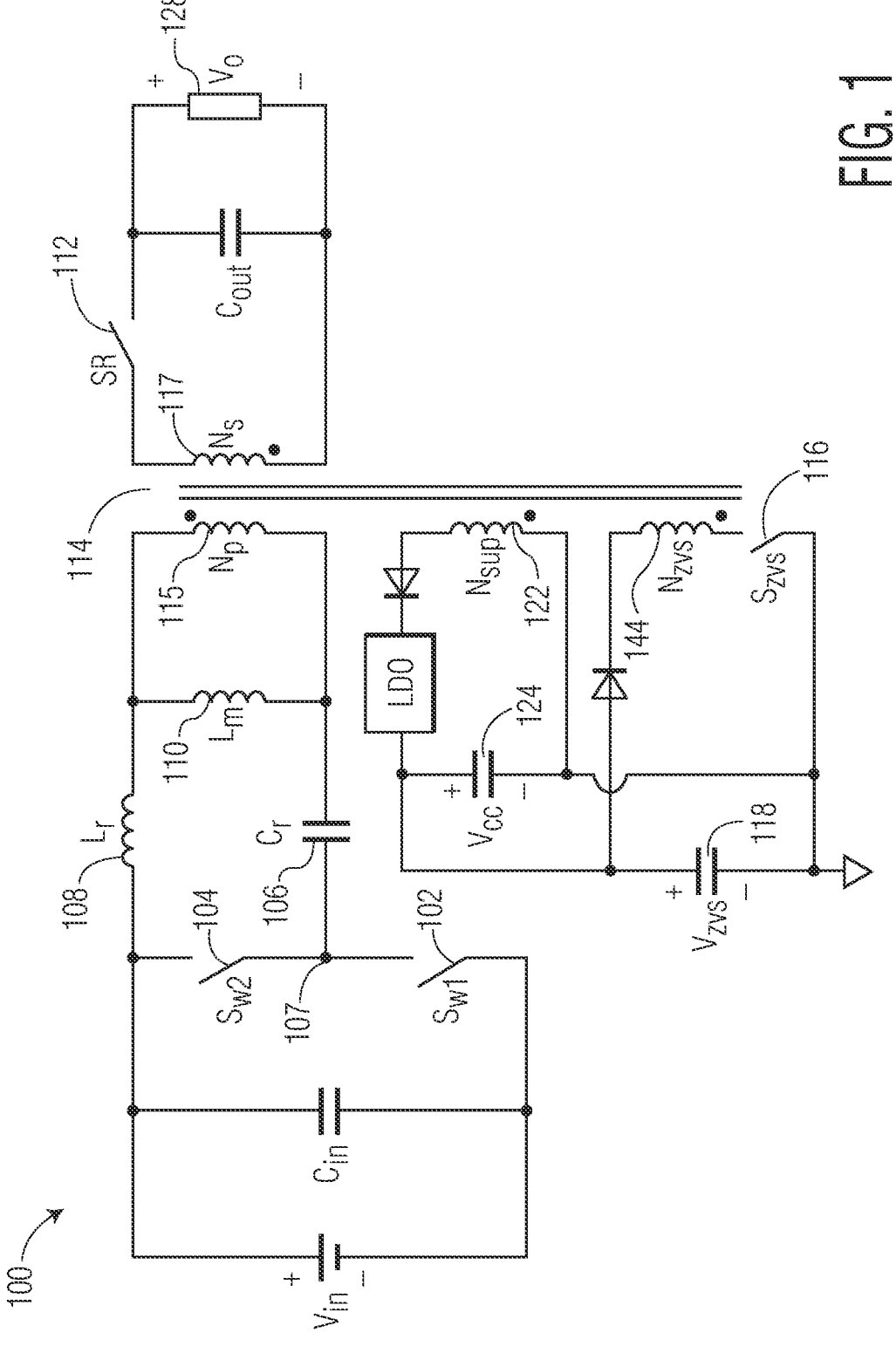
FIG. 1 shows a schematic of an asymmetric half-bridge flyback converter with a ZVS winding according to some embodiments.

Circuits, devices and related techniques disclosed herein relate generally to power converters. More specifically, circuits, devices and related techniques disclosed herein relate to control and operation methods to operate asymmetric half-bridge (AHB) flyback power converters with zero voltage switching (ZVS) of the main switch under all operating conditions including under discontinuous conduction mode (DCM) of operation, while preventing a false turn-on of the synchronous rectifier switch on the secondary side. In some embodiments, the AHB flyback power converter can include a ZVS winding coupled to a ZVS switch on the primary side, where the ZVS winding can have a winding direction opposite to that of the primary-side winding and have the same winding direction as that of the secondary-side winding. In this way, embodiments of the disclosure can enable ZVS operation of the main switch while preventing a false turn-on of the synchronous rectifier switch on the secondary side of the AHB flyback power converter. In various embodiments, disclosed methods can enable the ZVS switch to be turned on prior to the main switch being turned on, thereby enabling a turn on of the main switch with zero voltage across it.

In some embodiments, under all operational conditions including light load conditions, the on-time of the ZVS switch can be adjusted adaptively in order to improve the operational efficiency of the AHB flyback converter. In various embodiments, in a discontinuous conduction mode (DCM), the ZVS switch may be turned on at a valley and peak of a drain-source voltage of the main switch, thereby reducing switching losses of the ZVS switch. In some embodiments, the ZVS winding can be multiplexed with a part or all of the power supply winding enabling simplification of the transformer. Embodiments of the disclosure enable ZVS operation which can improve light load efficiency and can also reduce the electromagnetic interference (EMI) performance of the power converter, which can enable improved high frequency operation. Furthermore, embodiments of the disclosure can reduce the number of turns of transformer windings. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Zero-voltage switching (ZVS) is a soft switching method. ZVS can reduce the switching losses of a switch and improve an operational efficiency of the power converter. It can also reduce $dI/dt$ and $dV/dt$ of a circuit, thereby improving the electromagnetic compatibility (EMI) characteristics of the switching power converter. In Zero-voltage switching (ZVS) a drain-source voltage $V_{ds}$ of a switch may drop to 0 V before the switch is turned on.

In current approaches of operating AHB flyback power converters, in the discontinuous conduction mode (DCM), the auxiliary switch may be controlled to be turned on during ringing of a half-bridge (HB) node voltage. This may cause the synchronous rectifier switch on the secondary side to have a false turn-on. Additionally, the synchronous rectification controller may have a minimum on-time, which can be, for example, several hundred nano seconds. When the synchronous rectifier switch has false turn-on, the synchronous rectifier switch can be kept on for the minimum on-time, which can reduce the operational efficiency of the AHB flyback power converter, and can also increase the failure risk of the switching power converter.

FIG. 1 shows a schematic of an asymmetric half-bridge flyback converter with a ZVS winding according to some embodiments. As shown in FIG. 1, the asymmetric half-bridge (AHB) flyback converter with ZVS winding 100 can include a main switch 102, an auxiliary switch 104, a synchronous rectifier switch 112, a resonant capacitor 106, an excitation inductance 110 and a leakage inductance 108 of a transformer 114. The AHB flyback converter with ZVS winding 100 shows a single-winding power supply implementation. The main switch 102 may be coupled to the auxiliary switch 104 at a half-bridge (HB) node 107. The transformer 114 can have a primary winding 115 and a secondary winding 117. The secondary winding may have a winding direction that is opposite that of the primary winding. The main switch 102 and the auxiliary switch 104 are on the primary side, while the synchronous rectifier switch 112 is on the secondary side. When the main switch 102 is turned on, and the auxiliary switch 104 and the synchronous rectifier switch 112 are turned off, the excitation inductance 110 and the resonant capacitor 106 can store energy. When the main switch is turned off and the auxiliary switch is turned on, the energy stored in the transformer may be released to the secondary side.

The asymmetric half-bridge flyback converter with ZVS winding 100 can further include a ZVS winding 144 and a supply winding 122. The ZVS winding 144 may be coupled to a ZVS switch 116. Excitation voltage $V_{ZVS}$ 118 can be coupled to an input of the ZVS winding 144. In some embodiments, $V_{ZVS}$ 118 may be equal to the output voltage (Vo) 128. The supply winding 122 can have $N_{sup}$ turns. The supply winding 122 may be coupled to a $V_{cc}$ supply voltage 124. The ZVS winding 144 may have a winding direction that is opposite that of the primary winding and same direction of that of the secondary winding 117. Thus, the main switch 102 can be operated with ZVS while preventing the synchronous rectifier switch 112 from having a false turn-on. A false turn-on refers to an unintended turn-on of a switch. The power supply winding (or supply winding) may refer to a winding that can supply electrical energy for operation of circuits and integrated circuit chips on the system.

In some embodiments, the main switch 102 and the auxiliary switch 104 can be silicon based MOS transistors. In various embodiments, the main switch 102 and the auxiliary switch 104 can be gallium nitride based (GaN) transistors. In some embodiments, the main switch 102 and the auxiliary switch 104 can be silicon carbide based MOS transistors. In various embodiments, the main switch 102 and the auxiliary switch 104 can be bipolar transistors. In some embodiments, the synchronous rectifier switch can be silicon-based MOS transistor, GaN-based transistor, silicon carbide-based transistor or bipolar transistor. In various embodiments, the ZVS switch 116 can be silicon-based MOS transistor or bipolar transistor, GaN-based transistor, or silicon carbide-based transistor. In some embodiments, the ZVS switch 116 may be a triode.

Figure 2:
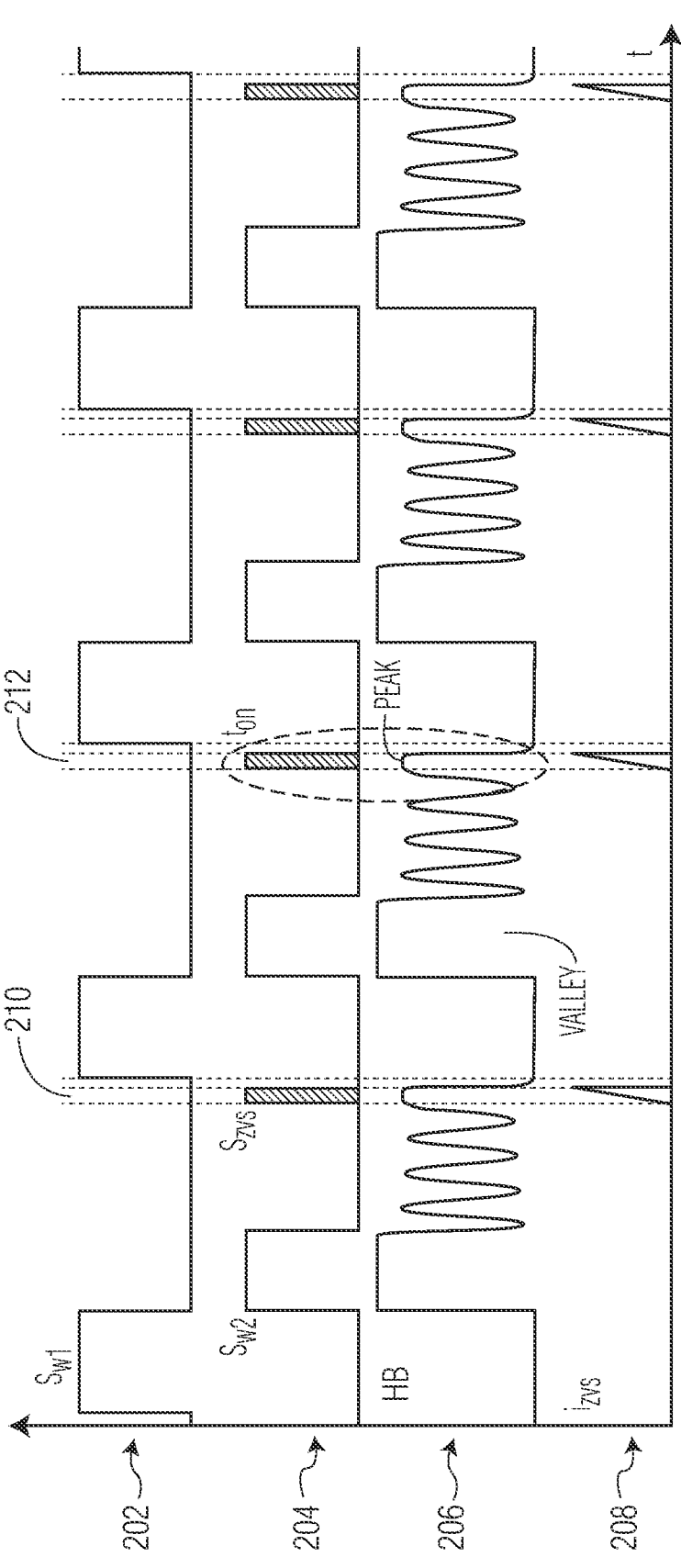
FIG. 2 shows operational waveforms of the asymmetric half-bridge flyback converter with ZVS winding of FIG. 1, according to some embodiments.

FIG. 2 shows operational waveforms of the asymmetric half-bridge flyback converter with ZVS winding 100, according to some embodiments. Graph 202 shows the switching waveforms for main switch 102, graph 204 shows switching waveforms for auxiliary switch 104, graph 206 shows switching waveforms for HB node 107 and graph 208 shows operation waveforms for the current through the ZVS winding $i_{ZVS}$. As shown in FIG. 2, during time period 210, i.e., prior to the main switch 102 being turned on, the ZVS switch 116 can be turned on, so that the main switch 102 can operate with zero-voltage switching (ZVS) under all output load conditions. When the ZVS switch 116 is turned on, a current $i_{ZVS}$, that is flowing through the ZVS winding may continue to increase, causing an excitation energy to be stored in the ZVS winding 144. When the ZVS switch 116 is turned off, the energy stored in the ZVS winding 144 can be transferred to the primary-side winding $N_p$ to create a zero-voltage condition for the main switch 102 that is to be turned on.

As shown in FIG. 2, during time period 212, an on-time $t_{on}$ of the ZVS switch may have a self-adaptive adjustment characteristic. Under different working conditions, the on-time $t_{on}$ may be adjusted adaptively to improve operating performance of the AHB flyback converter with ZVS winding 100. When the output voltage 128 of the converter is relatively high, the excitation voltage $V_{ZVS}$ 118 of the ZVS winding may be relatively large. The on-time $t_{on}$ may be adaptively decreased to reduce the circulating energy in the zero voltage switching. When the output voltage 128 of the converter is relatively low, the excitation voltage $V_{ZVS}$ 118 of the ZVS winding may be relatively small. The on-time $t_{on}$ may be adaptively increased to ensure that the main switch 102 can operate with zero-voltage switching (ZVS).

When the output power continues to decrease, the AHB flyback converter with ZVS winding 100 may change from the boundary conduction mode (BCM) to discontinuous conduction mode (DCM). In the discontinuous conduction mode, the drain-source voltage $V_{ds}$ of the main switch 102 may have ringing. The ZVS switch 116 can be controlled to be turned on at a valley and peak of the drain-source voltage $V_{ds}$ of the main switch 102. This can reduce the switching losses of the ZVS switch 116 and improve the efficiency of the converter.

Embodiments of the disclosure can prevent the synchronous rectifier switch 112 from having a false turn-on. The ZVS winding 144 and the secondary winding 117 can form a forward converter. When the ZVS switch 116 is turned on, there may be a risk of false turn on of the synchronous rectifier switch 112. To prevent the synchronous rectifier switch 112 from a false turn-on, the number of turns of the ZVS winding $N_{ZVS}$ satisfies the following equation:

$$N_{zvs} > \frac{N_s V_{zvs}}{V_o} \tag{1}$$

where $N_{ZVS}$ is the total number of turns of the ZVS winding 144, $N_s$ is the total number of turns of the secondary winding 117, $V_o$ is an output voltage 128 of the converter, and $V_{ZVS}$ is an input voltage of the ZVS winding 144.

Figure 3:
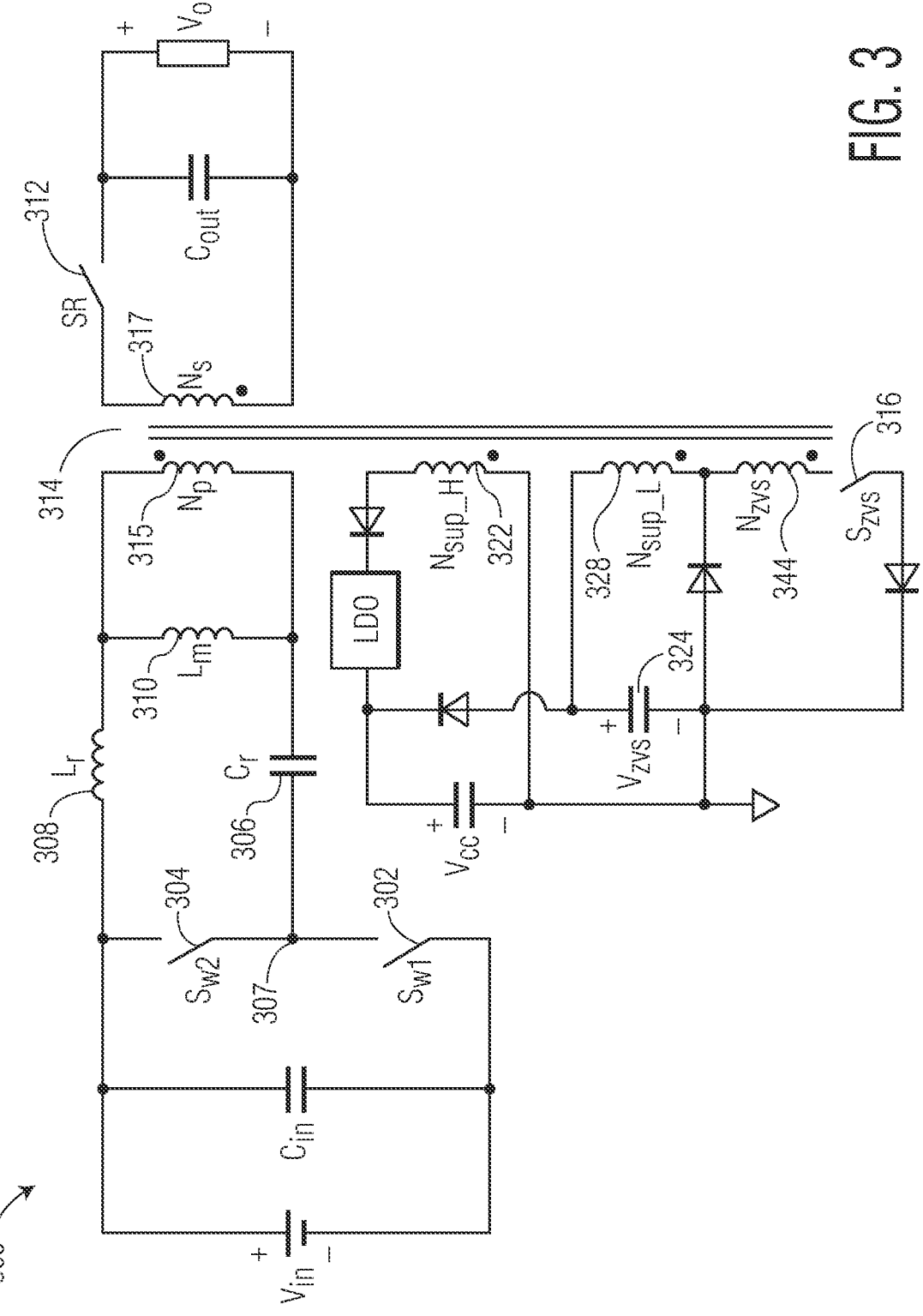
FIG. 3 shows a schematic of an asymmetric half-bridge flyback converter with a ZVS winding multiplexed with power supply windings, according to certain embodiments.

FIG. 3 shows a schematic of an asymmetric half-bridge flyback converter with a ZVS winding multiplexed with power supply windings, according to certain embodiments. By multiplexing the ZVS winding with power supply winding, the structure of the transformer winding can be simplified. Further, the illustrated embodiment can reduce the operational losses of the power supply circuit and can improve the operational efficiency of the switching power converter. As shown in FIG. 3, the asymmetric half-bridge flyback converter with ZVS winding multiplexed with power supply windings 300 can include a main switch 302, an auxiliary switch 304, a synchronous rectifier switch 312, a resonant capacitor 306, an excitation inductance 310 and a leakage inductance 308 of a transformer 314. The main switch 302 may be coupled to the auxiliary switch 304 at a half-bridge HB node 307. The transformer 314 can have a primary winding 315 and a secondary winding 317. The main switch 302 and the auxiliary switch 304 are on the primary side, while the synchronous rectifier switch 312 is on the secondary side. A ZVS winding 344 can be coupled to a ZVS switch 316, where the ZVS winding 344 can be coupled to a low-side supply winding 328. The low-side supply winding 328 may be coupled to a voltage source 324. A high-side supply winding 322 can be positively coupled to the secondary winding. ZVS winding 344 and the low-side supply winding 328 can also be positively coupled to the secondary winding.

In some embodiments, the main switch 302 and the auxiliary switch 304 can be silicon based MOS transistors. In various embodiments, the main switch 302 and the auxiliary switch 304 can be gallium nitride based (GaN) transistors. In some embodiments, the main switch 302 and the auxiliary switch 304 can be silicon carbide based MOS transistors. In various embodiments, the main switch 302 and the auxiliary switch 304 can be bipolar transistors. In some embodiments, the synchronous rectifier switch can be silicon-based MOS transistor, GaN-based transistor, silicon carbide-based transistor or bipolar transistor. In various embodiments, the ZVS switch 316 can be silicon-based MOS transistor or bipolar transistor, GaN-based transistor, or silicon carbide-based transistor. In some embodiments, the ZVS switch 316 may be a triode.

In the asymmetric half-bridge flyback converter with a ZVS winding multiplexed with power supply winding 300, the power supply winding can be divided into a high-side supply winding $N_{sup-H}$ 322 and a low-side supply winding $N_{sup-L}$ 328. The number of turns of the high-side supply winding $N_{sup-H}$ 322 may be greater than the number of turns of the low-side supply winding $N_{sup-L}$ 328, i.e., $N_{sup-H} > N_{sup-L}$. In FIG. 3, the ZVS winding 344 may be multiplexed with the low-side supply winding $N_{sup-L}$ 328. When ZVS winding is multiplexed with the low-side supply winding ($N_{sup-L}$), equation (2) can ensure that a false turn-on of the synchronous switch is prevented:

$$N_{zvs} + N_{sup\_L} > \frac{N_s V_{zvs}}{V_o} \quad (2)$$

$$N_{zvs} + N_{sup\_L} > \frac{N_s V_{zvs}}{V_o}$$

An example of the asymmetric half-bridge flyback converter with ZVS winding multiplexed with power supply windings 300 is described now. In this example, the number of turns $N_p$ of the primary winding 315 can be 24, the number of turns $N_s$ of the secondary winding 317 can be 4, a number of low-side supply winding turns 328 can be 4, and the number of turns of the high-side supply winding 322 can be 12. Since the number of turns of the low-voltage power supply winding and that of the secondary-side winding are equal, the excitation voltage $V_{ZVS}$ of the ZVS winding can be equal to the output voltage Vo. Therefore, as long as the total number of turns of the ZVS winding 344 is greater than the number of turns of the secondary winding 317, the synchronous rectifier switch 312 can be prevented from a false turn-on. As described in this example, only one additional turn of the ZVS winding may be used to ensure zero-voltage switching (ZVS) of the main switch 302, thus there is no risk of a false turn-on of the synchronous rectifier switch 312.

Figure 4:
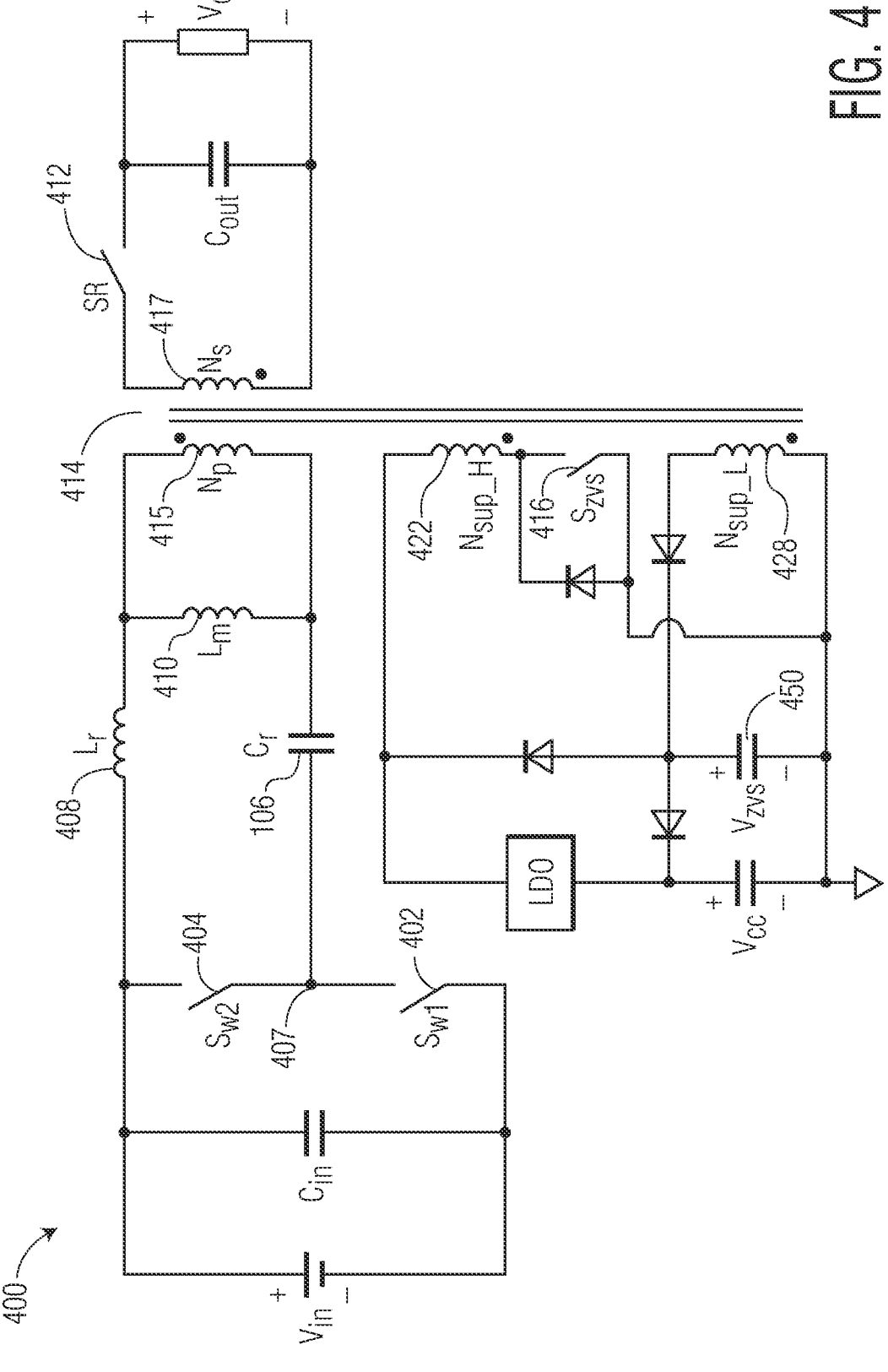
FIG. 4 shows a schematic of an asymmetric half-bridge flyback converter with a ZVS winding multiplexed with high-side power supply winding, according to certain embodiments.

FIG. 4 shows a schematic of an asymmetric half-bridge flyback converter with a ZVS winding multiplexed with high-side power supply winding, according to certain embodiments. In FIG. 4, the ZVS winding is multiplexed with the high-side supply winding $N_{sup-H}$ 322. As shown in FIG. 4, the asymmetric half-bridge flyback converter with ZVS winding multiplexed with power supply windings 400 can include a main switch 402, an auxiliary switch 404, a synchronous rectifier switch 412, a resonant capacitor 406, an excitation inductance 410 and a leakage inductance 408 of a transformer 414. The main switch 402 may be coupled to the auxiliary switch 404 at a half-bridge HB node 407. The transformer 414 can have a primary winding 415 and a secondary winding 417. A ZVS switch 416 may be coupled to a high-side supply winding 422. A low-side supply winding 428 may be coupled to an excitation source 450. The high-side supply winding and the low-side supply winding 428 can be positively coupled to the secondary winding 417. When ZVS winding is multiplexed with the high-side supply winding ($N_{sup-H}$), equation (3) can ensure that a false turn-on of the synchronous switch is prevented:

$$N_{sup\_H} > \frac{N_s V_{zvs}}{V_o} \quad (3)$$

In some embodiments, the main switch 402 and the auxiliary switch 404 can be silicon based MOS transistors. In various embodiments, the main switch 402 and the auxiliary switch 404 can be gallium nitride based (GaN) transistors. In some embodiments, the main switch 402 and the auxiliary switch 404 can be silicon carbide based MOS transistors. In various embodiments, the main switch 402 and the auxiliary switch 404 can be bipolar transistors. In some embodiments, the synchronous rectifier switch can be silicon-based MOS transistor, GaN-based transistor, silicon carbide-based transistor or bipolar transistor. In various embodiments, the ZVS switch 416 can be silicon-based MOS transistor or bipolar transistor, GaN-based transistor, or silicon carbide-based transistor. In some embodiments, the ZVS switch 416 may be a triode.

An example of the asymmetric half-bridge flyback converter with ZVS winding multiplexed with power supply windings 400 is described now. In this example, the number of turns $N_p$ of the primary-side winding can be 24, the number of turns $N_s$ of the secondary-side winding can be 4, the number of turns $N_{sup\_L}$ of the low-voltage power supply winding 428 can be 4, and the number of turns of the high-voltage power supply winding 422 can be 12. Since the number of turns of the low-voltage power supply winding and that of the secondary-side winding are equal, the excitation voltage $V_{ZVS}$ of the ZVS winding is equal to the output voltage Vo. Therefore, as long as the total number of turns of the ZVS winding is greater than the number of turns of the secondary-side winding, the synchronous rectifier switch can be prevented from a false turn-on. Thus, as shown in FIG. 4, no additional ZVS winding is used, and the use of the high-voltage power supply winding can ensure zero-voltage switching (ZVS) of the main switch 402.

Figure 5:
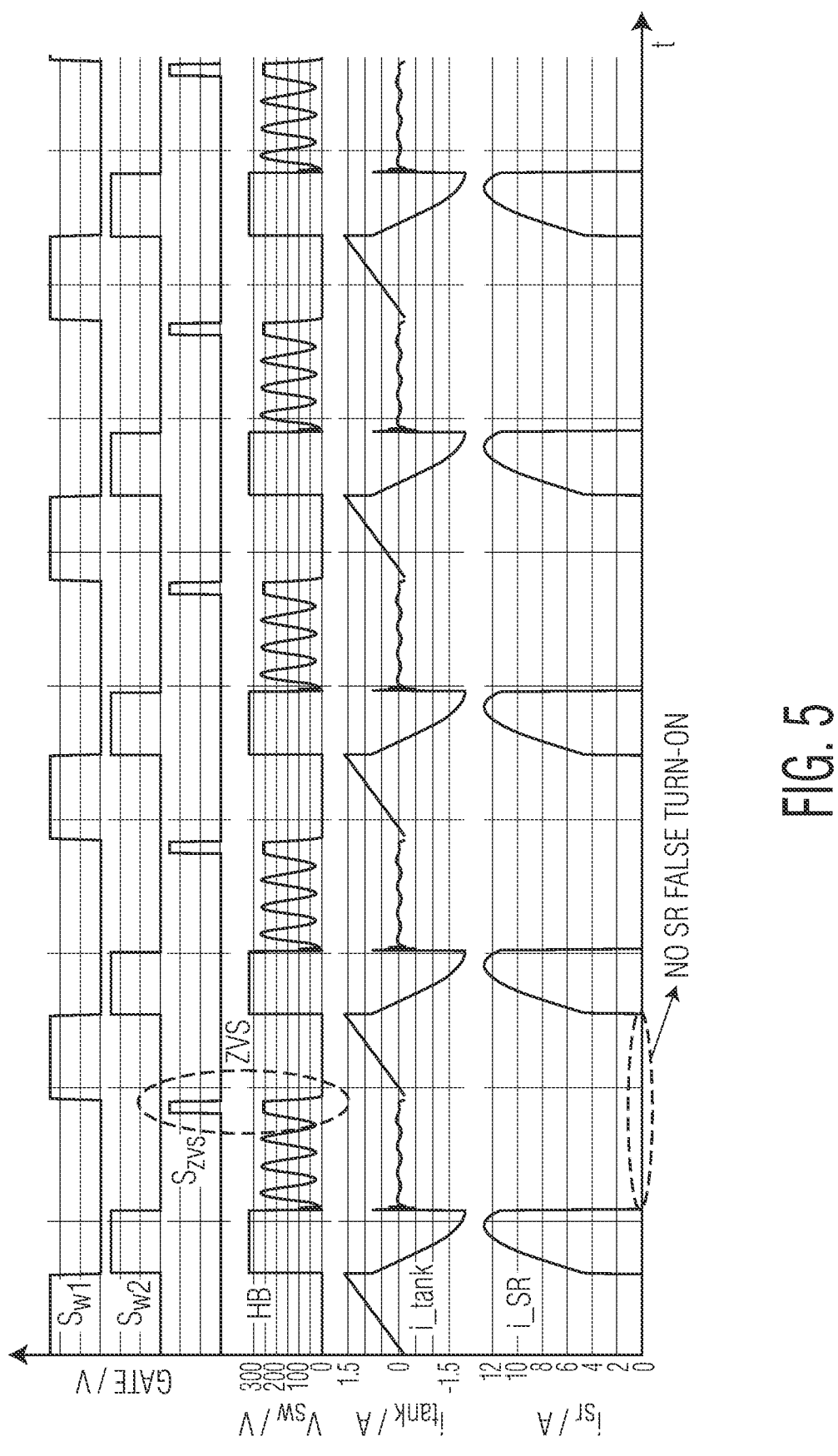
FIG. 5 shows simulation results for an operation of the asymmetric half-bridge flyback converter with ZVS winding of FIG. 1.

FIG. 5 shows simulation results for an operation of the asymmetric half-bridge flyback converter with ZVS winding 100. In FIG. 5, the ZVS tube may be turned on before the main switch tube is turned on. After the ZVS switch 116 is turned off, after approximately 100 ns, the main switch 102 can switch with zero-voltage switching (ZVS). In addition, the ZVS switch 116 may be turned on at the valley and peak of the drain-source voltage of the main switch 102, which can reduce the switching losses. The on-time $t_{on}$ of the ZVS switch can be adjusted adaptively to improve the efficiency of the asymmetric half-bridge flyback converter. When the output voltage is 28 V, the on-time of ZVS switch may be adaptively decreased to reduce the circulating energy. When the output voltage Vo drops to 9 V, the on-time of the ZVS switch may be adaptively increased to ensure that the main switch tube realizes ZVS.

In some embodiments, combination of the circuits and methods disclosed herein can be utilized for operating an asymmetric half-bridge flyback converter. Although circuits and methods are described and illustrated herein with respect to several particular configuration of an asymmetric half-bridge flyback converter, embodiments of the disclosure are suitable for controlling and operating other power converter topologies, such as, but not limited to, half-bridge flyback and LLC converters.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
a transformer including a primary winding extending between a first terminal and a second terminal, and further including a secondary winding extending between a third terminal and a first output terminal;
a first switch having a first gate terminal, a first source terminal and a first drain terminal, the first drain terminal coupled to the second terminal and the first source terminal coupled to a power source;
a second switch having a second gate terminal, a second source terminal and a second drain terminal, the second source terminal coupled to the second terminal, and the second drain terminal coupled to the power source;
a third switch having a third gate terminal, a third source terminal and a third drain terminal, the third source terminal coupled to the third terminal and the third drain terminal coupled to a second output terminal;
a first winding having a winding direction that is opposite to that of the primary winding and being electromagnetically coupled to the primary winding;
a fourth switch having a fourth gate terminal, a fourth source terminal and a fourth drain terminal, wherein the fourth drain terminal is coupled to the first winding; and
a load coupled between the first output terminal and the second output terminal, the load having an output voltage across it;
wherein when the output voltage is high, an on-time of the fourth switch is decreased and when the output voltage is low, the on-time of the fourth switch is increased.

2. The circuit of claim 1, further comprising a second winding having a winding direction that is opposite to that of the primary winding, the second winding coupled to the first winding.

3. The circuit of claim 1, wherein the fourth switch is arranged to be turned-on prior to a first switch turn-on.

4. The circuit of claim 3, wherein the fourth switch is a gallium nitride (GaN) based transistor.

5. The circuit of claim 1, wherein the first winding is arranged to have a number of turns that is greater than a product of number of turns of the secondary winding and voltage across the first winding divided by the output voltage.

6. The circuit of claim 1, wherein the fourth switch is a silicon based transistor.

7. The circuit of claim 1, wherein the secondary winding has a winding direction that is opposite to that of the primary winding.

8. A circuit comprising:
a transformer including a primary winding extending between a first terminal and a second terminal, and further including a secondary winding extending between a third terminal and a first output terminal;
a first switch having a first gate terminal, a first source terminal and a first drain terminal, the first drain terminal coupled to the second terminal and the first source terminal coupled to a power source;
a second switch having a second gate terminal, a second source terminal and a second drain terminal, the second source terminal coupled to the second terminal, and the second drain terminal coupled to the power source;
a third switch having a third gate terminal, a third source terminal and a third drain terminal, the third source terminal coupled to the third terminal and the third drain terminal coupled to a second output terminal;
a first winding having a winding direction that is opposite to that of the primary winding and being electromagnetically coupled to the primary winding;
a low-side winding having a winding direction that is opposite to that of the primary winding, the low-side winding coupled to the first winding; and
a high-side winding having a winding direction that is opposite to that of the primary winding, the high-side winding coupled to the first winding.

9. The circuit of claim 8, further comprising a fourth switch having a fourth gate terminal, a fourth source terminal and a fourth drain terminal, wherein the fourth drain terminal is coupled to the first winding.

10. The circuit of claim 9, wherein the fourth switch is arranged to be turned-on prior to a first switch turn-on.

11. The circuit of claim 8, wherein the secondary winding has a winding direction that is opposite to that of the primary winding.

12. A circuit comprising:

a transformer including a primary winding extending between a first terminal and a second terminal, and further including a secondary winding extending between a third terminal and a first output terminal;

a first switch having a first gate terminal, a first source terminal and a first drain terminal, the first drain terminal coupled to the second terminal and the first source terminal coupled to a power source;

a second switch having a second gate terminal, a second source terminal and a second drain terminal, the second source terminal coupled to the second terminal, and the second drain terminal coupled to the power source;

a third switch having a third gate terminal, a third source terminal and a third drain terminal, the third source terminal coupled to the third terminal and the third drain terminal coupled to a second output terminal;

a low-side winding having a winding direction that is opposite to that of the primary winding and being electromagnetically coupled to the primary winding;

a high-side winding having a winding direction that is opposite to that of the primary winding, the high-side winding coupled to the low-side winding; and a second winding having a winding direction that is opposite to that of the primary winding.

13. The circuit of claim 12, further comprising a fourth switch having a fourth gate terminal, a fourth source terminal and a fourth drain terminal, wherein the fourth drain terminal is coupled to the high-side winding.

14. The circuit of claim 13, wherein the fourth switch is arranged to be turned-on prior to a first switch turn-on.

15. The circuit of claim 13, wherein the fourth switch is gallium nitride (GaN) based transistor.

16. The circuit of claim 12, wherein the first switch is GaN-based transistor.

* * * * *